(12) United States Patent
Wang et al.

(10) Patent No.: US 10,278,242 B2
(45) Date of Patent: *Apr. 30, 2019

(54) THERMAL AND POWER OPTIMIZATION FOR LINEAR REGULATOR

(71) Applicant: DIODES INCORPORATED, Plano, TX (US)

(72) Inventors: Adrian Wang, San Jose, CA (US); Chien-Jen Su, Tainan (TW)

(73) Assignee: DIDDES INCORPORATED, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,892

(22) Filed: Jul. 21, 2017

(65) Prior Publication Data

US 2018/0014370 A1    Jan. 11, 2018

Related U.S. Application Data

(63) Continuation-in-part of application No. 15/094,817, filed on Apr. 8, 2016, now Pat. No. 10,136,487.

(60) Provisional application No. 62/365,373, filed on Jul. 21, 2016, provisional application No. 62/145,435, filed on Apr. 9, 2015.

(51) Int. Cl.
 *H05B 37/02* (2006.01)
 *H05B 33/08* (2006.01)
 *G05F 1/46* (2006.01)

(52) U.S. Cl.
 CPC ......... *H05B 33/0812* (2013.01); *G05F 1/461* (2013.01); *H05B 33/0815* (2013.01); *H05B 33/0827* (2013.01); *H05B 33/0845* (2013.01); *Y02B 20/345* (2013.01)

(58) Field of Classification Search
 CPC ............ H05B 33/0815; H05B 33/0845; H05B 33/0875; H05B 33/0884; H05B 33/0887
 USPC .......................................... 315/192, 297, 307
 See application file for complete search history.

(56) References Cited

U.S. PATENT DOCUMENTS

| | | |
|---|---|---|
| 7,843,150 B2 | 11/2010 | Wang et al. |
| 8,912,770 B2 | 12/2014 | Cai et al. |
| 9,538,601 B1 * | 1/2017 | Mangtani ........... H05B 33/0854 |
| 2010/0141159 A1 * | 6/2010 | Shiu .................... H05B 33/0827 315/185 R |
| 2010/0315057 A1 | 12/2010 | Zambetti |

(Continued)

OTHER PUBLICATIONS

U.S. Appl. No. 15/094,817, Final Office Action dated Sep. 22, 2017, 10 pages.

(Continued)

*Primary Examiner* — Tung X Le

(57) ABSTRACT

A power supply includes a power converter configured to convert an input voltage to a target output DC voltage in response to a feedback signal, the feedback signal having a value. The power supply also includes a regulator coupled to the power converter and configured to generate an output power status signal, which maybe in one of two states depending whether an output current from the regulator is above or below a target current over a preset time duration. Further, a control circuit is coupled to the power converter and to the regulator and configured to increment or decrement the value of the feedback signal depending on the state of the power status signal.

22 Claims, 11 Drawing Sheets

(56) References Cited

U.S. PATENT DOCUMENTS

| | | | |
|---|---|---|---|
| 2010/0327772 A1* | 12/2010 | Lee | H05B 33/0818 |
| | | | 315/297 |
| 2010/0327835 A1 | 12/2010 | Archibald | |
| 2011/0080110 A1* | 4/2011 | Nuhfer | H05B 33/0815 |
| | | | 315/291 |
| 2011/0193542 A1* | 8/2011 | Kwok | H02M 1/32 |
| | | | 323/284 |
| 2013/0009556 A1* | 1/2013 | Szczeszynski | H03K 7/08 |
| | | | 315/185 R |
| 2013/0049621 A1* | 2/2013 | Yan | H05B 33/0815 |
| | | | 315/205 |
| 2013/0113445 A1 | 5/2013 | Cai et al. | |
| 2013/0169172 A1* | 7/2013 | Kesterson | H05B 33/0815 |
| | | | 315/186 |
| 2013/0200812 A1* | 8/2013 | Radermacher | H05B 33/0824 |
| | | | 315/186 |
| 2014/0192102 A1 | 7/2014 | Im et al. | |
| 2016/0255693 A1* | 9/2016 | Wang | H05B 33/0812 |
| | | | 315/185 R |
| 2016/0302270 A1 | 10/2016 | Wang | |
| 2017/0303358 A1* | 10/2017 | Wang | H05B 33/0827 |

OTHER PUBLICATIONS

U.S. Appl. No. 15/094,817, Non-Final Office Action dated Jun. 16, 2017, 10 pages.

Atmel Corp., Atmel LED Driver-MSL3162, 16-string, RGB and White LED Drivers with Adaptive Power Control and 1MHz I²C/SMBus Serial Interface, MSL3162BT Datasheet, Available online at www.atmel.com/images/ f1_msl3162 _db.pdf, 2011, 20 pages.

Texas Instruments, TPS9263x-Q1 Three-Channel Linear LED Driver With Analog and PWM Dimming, Available online at http://www.ti.com.cn/cn/lit/ds/slvsc76b/slvsc76b.pdf, Feb. 2014, 39 pages.

\* cited by examiner

THERMAL AND POWER OPTIMIZATION FOR LINEAR REGULATOR

CROSS-REFERENCES TO RELATED APPLICATIONS

This application claims priority to U.S. Provisional Patent Application No. 62/365,373, filed Jul. 21, 2016, entitled "THERMAL AND POWER OPTIMIZATION FOR LINEAR REGULATOR," commonly owned and incorporated by reference herein in its entirety. This application is also a continuation-in-part application of U.S. patent application Ser. No. 15/094,817, filed Apr. 8, 2016, entitled "POWER OPTIMIZATION FOR LINEAR REGULATOR," which claims priority to U.S. Provisional Patent Application No. 62/126,440, filed Apr. 9, 2015, entitled "POWER OPTIMIZATION FOR LINEAR REGULATOR," commonly owned and incorporated by reference herein.

This application is also related to U.S. patent application Ser. No. 15/049,590 filed Feb. 22, 2016, entitled "ANALOG AND DIGITAL DIMMING CONTROL FOR LED DRIVER" which claims priority to U.S. Provisional Patent Application No. 62/126,440, filed Feb. 27, 2015, entitled "ANALOG AND DIGITAL DIMMING CONTROL FOR LED DRIVER" commonly owned and incorporated by reference herein.

Light-emitting diodes (LED) offer many advantages over conventional lighting apparatus, such as long lifetime, high efficiency, and non-toxic materials. With the development of electronic technology, light-emitting diodes are finding ever wider applications. For example, in consumer applications, LED light bulbs are showing promise as replacements for conventional white light incandescent or florescent light bulbs. Further, more and more electronic devices adopt LCD as display, and LEDs are becoming increasingly popular as a backlight source.

In LED applications, each LED load may be an LED string having multiple light-emitting diodes connected in series. A power switch may be coupled to a plurality of LED loads in parallel. Alternatively, an integrated circuit controller may be coupled to each one of a plurality of LED loads to control the current flow in each LED load separately. In order to improve the power efficiency, it is desirable for the power supply to provide the lowest power necessary to maintain a regulated output for the load. Therefore, it is desirable to minimize the dropout voltage for the power supply. A dropout voltage of a voltage regulator is the smallest possible difference between the input voltage and output voltage to maintain the power converter's intended operating range.

Some conventional approaches describe a feedback control of power conversion for a single LED string to provide dropout voltage optimization. Other conventional approaches provide a constant current regulator for multiple channels, but do not provide low dropout voltage optimization. Another conventional approach describes an efficiency optimizer that reduces an external LED power supply output voltage by injecting a current in a feedback loop to the power supply, if the LED strings need less power.

BRIEF SUMMARY OF THE INVENTION

The inventor has recognized the limitations in conventional LED power supplies regarding power efficiency. In some conventional approaches, the LED power supply voltage is reduced by injecting a current in a feedback loop of the power supply. The injected current has a fixed range, and can only reduce the power supply to the LED strings to reduce power consumption. It cannot increase the power supply to the LED strings when the operating condition changes and requires a higher power supply.

This invention teaches circuits and systems for an LED power supply that provides efficient power supply voltage to the linear regulators. Unlike conventional approaches, a controller monitors the current flow in multiple LED strings and can either lower or raise the LED power supply voltage. If the currents in the LED strings are higher than required, a feedback current is sent to the power supply to decrease its output. If the currents in the LED strings are lower than required, a feedback current is sent to the power supply to increase its output. This capability enables the power supply to respond to operating condition changes that require a higher or lower power supply. Further, the controller can provide real-time control of low dropout voltages at different loading and temperature conditions to lower power consumption and improve the power efficiency.

For example, a power supply for driving a plurality of LED strings may include a power converter, a multiple-channel linear regulator, and a control circuit. The power converter provides a constant DC output voltage to the LED strings. The multiple-channel linear regulator includes a linear regulator for each LED string, and each linear regulator regulates a current in the LED string in response to a PWM (pulse mode modulation) control signal. The multiple-channel linear regulator also provides an output power status signal. In every PWM switching cycle, the output power status signal is high if the current in any one of the LED strings is above a target current value for that LED string, and the output power status signal is low if the current in all LED strings is below the target current value. The control circuit monitors the output power status signal and provides a feedback signal to the power converter to increase or decrease the DC output voltage accordingly. For example, the controller may monitor the output status signal over a period of time, and increment the feedback signal to cause the power supply to lower its output voltage if the output power status signal is high during any PWM switching cycle in that period of time. If the output power status signal remains low during all PWM switching cycles in the period of time, the feedback signal is decremented to cause the power supply to increase its output voltage. Further, a microcontroller may be used to monitor the output status signal and provide real-time control of low dropout voltages at different loading and temperature conditions to lower power consumption and improve the overall efficiency of the power supply.

DEFINITIONS

The terms used in this disclosure generally have their ordinary meanings in the art within the context of the invention. Certain terms are discussed below to provide additional guidance to the practitioners regarding the description of the invention. It will be appreciated that the same thing may be said in more than one way. Consequently, alternative language and synonyms may be used.

A voltage converter or power converter is a device for changing the voltage of a power source.

A regulator or voltage regulator is a device for automatically maintaining a constant voltage level.

A linear regulator is an electronic circuit used to maintain a steady voltage. Linear regulators may place the regulating device in parallel with the load (shunt regulator) or may place the regulating device between the source and the regulated load (a series regulator). The regulating device is made to act like a variable resistor, continuously adjusting a voltage divider network to maintain a constant output voltage, and continually dissipating the difference between the input and regulated voltages. By contrast, a switching regulator uses an active device that switches on and off to maintain an average value of output.

A dropout voltage of a voltage regulator is the smallest possible difference between the input voltage and output voltage to remain the regulator's intended operating range. For example, a regulator with 5 volt output and 2 volt dropout voltage rating will only output 5 volts if the input voltage is above 7 volts (7 volt input >5 volt output +2 volt dropout). If the input falls below 7 volts, the output will fail to regulate to 5 volts.

A constant-current regulator is a linear regulator that provides a constant output current.

A light-emitting diode (LED) is a two-lead semiconductor light source. It is a p-n junction diode, which emits light when activated. When a suitable voltage is applied to the leads, electrons are able to recombine with electron holes within the device, releasing energy in the form of photons.

An LED string is two or more LEDs connected in series.

An analog signal is a continuous signal having a time varying feature. It differs from a digital signal, which includes a sequence of discrete values which may only take on one of a finite number of values.

Pulse-width modulation (PWM) is a modulation technique used to encode a message into a pulsing signal. In a power regulator, the average value of voltage (and current) fed to the load is controlled by turning the switch between supply and load on and off at a fast rate. The longer the switch is on compared to the off periods, the higher the total power supplied to the load. The term duty cycle describes the proportion of 'on' time to the regular interval or 'period' of time; a low duty cycle corresponds to low power, because the power is off for most of the time. The duty cycle is expressed in percent, 100% being fully on.

A multiplexer (mux) circuit is an electronics device that selects one of several input signals and forwards the selected input into a single line. For example, a multiplexer of 2n inputs has n select lines, which are used to select which input line to send to the output.

A state machine is a mathematical model of computation used to design both computer programs and sequential logic circuits. It is conceived as an abstract machine that may be in one of a finite number of states. The machine is in only one state at a time; the state it is in at any given time is called the current state. It may change from one state to another when initiated by a triggering event or condition; this is called a transition. A particular FSM is defined by a list of its states, and the triggering condition for each transition.

A comparator circuit is an electronic device that compares two voltages or currents and outputs a digital signal indicating which is larger.

A microcontroller is a small computer (SoC) on a single integrated circuit containing a processor core, memory, and input/output peripherals. Microcontrollers are often used in automatically controlled products and devices.

DETAILED DESCRIPTION OF THE INVENTION

Figure 1:
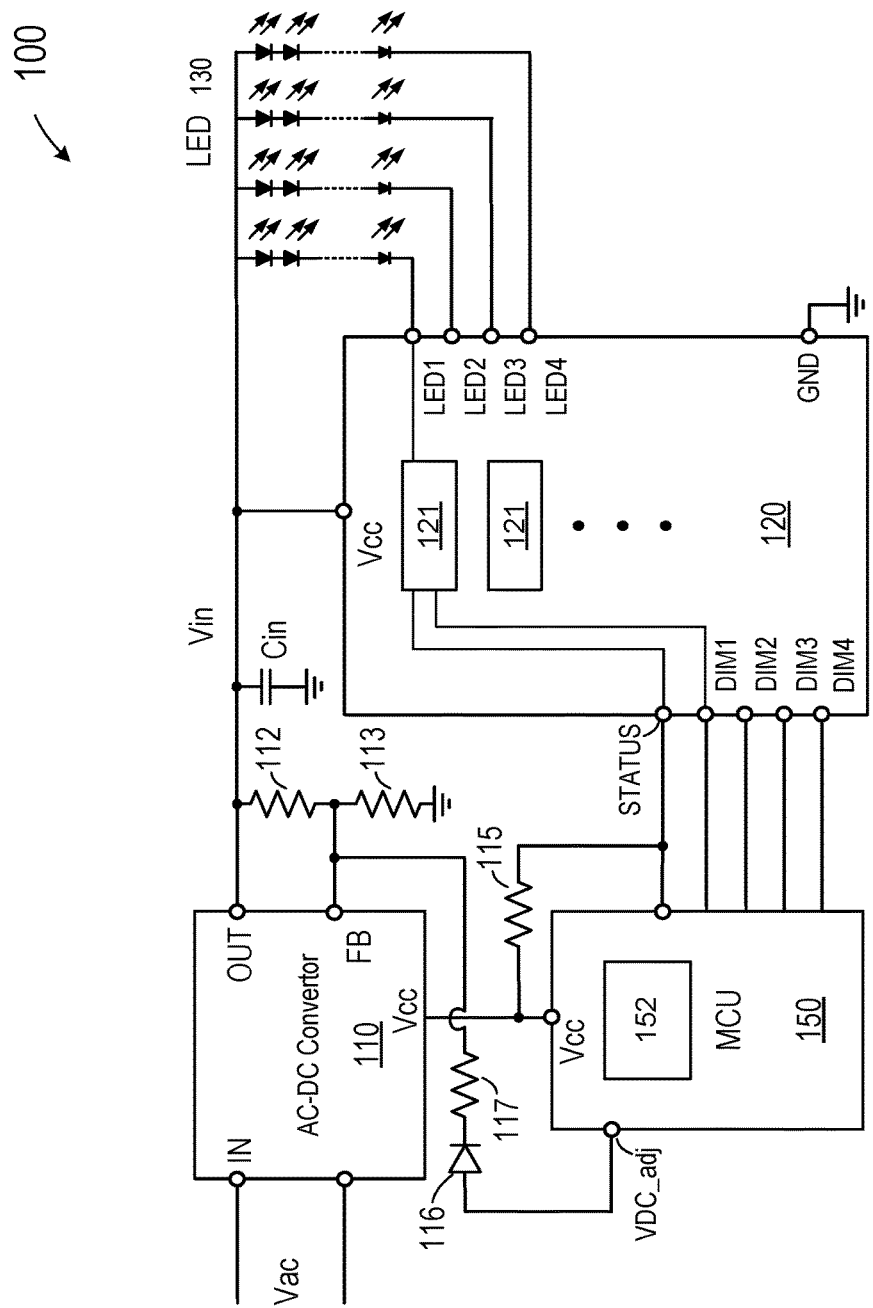
FIG. 1 is a simplified schematic diagram depicting a power supply for driving an LED (light-emitting-diode) lamp that embodies certain aspects of this invention.

FIG. 1 is a simplified schematic diagram depicting a power supply for driving an LED (light-emitting-diode) lamp load that embodies certain aspects of this invention. As shown in FIG. 1, power supply 100 includes a power converter 110, e.g., an AC-DC converter, coupled to an AC input source Vac for providing a DC voltage source Vin to an LED load 130 including a plurality of LED strings. Power converter 110 includes a power input node IN coupled to the AC input power source, an output node OUT coupled to a first end of each of the plurality of LED strings, and a feedback node FB for receiving a feedback signal derived from the output node. The power converter converts an AC or DC input voltage at the power input node to an output DC voltage on the output node in response to, in part, the feedback signal. In this embodiment, the feedback signal is derived from the DC output voltage Vin through a voltage divider that includes resistors 112 and 113. For simplicity, in this description, the name of a signal is also used to designate the terminal that provides that signal.

Power supply 100 also includes a regulator 120, e.g., a linear regulator, with a power terminal Vcc coupled to the DC voltage source for receiving a DC power supply. As shown in FIG. 1, DC power supply Vin provides power for LED lamp 130, which has multiple LED strings. In FIG. 1, Vin is connected to the anodes of the LED strings. Alternatively, Vin may also be connected to the cathodes of the LED strings. Linear regulator 120 also includes one or more channels 121 for regulating a current flow in the LED strings. Linear regulator 120 also has output terminals LED1, . . . , LED4, etc., each coupled to a respective LED string of the LED lamp, and input terminals, DIM1, . . . , DIM4, etc., for receiving a dimming input signal for each channel. Linear regulator 120 provides an output power status signal STATUS that is either in a first state or a second state, e.g., high or low. For example, output power status signal STATUS may be in the first state if the current in any one of the LED strings is above a target current for that LED string, and output power status signal STATUS may be in the second state if the current in that LED string is below the target current for that LED string. Of course, the designation of first state or second state may be changed according to the specific embodiment.

Power supply 100 also includes a control circuit 150 coupled to power converter 110 and regulator 120, and the control circuit increments or decrements feedback signal FB in response to the output power status signal STATUS, thereby to enable the power converter to adjust the output DC voltage. The control circuit determines an appropriate action to adjust the power converter output voltage for different temperatures and loading operating conditions. As a result, the DC output voltage Vin provided to the regulator will be just enough to maintain low dropout voltage required by the regulator. With this real-time dynamic adjustment, the system provides a suitable DC voltage for the regulator to maintain the correct regulation action at low power consumed by the regulator and improve the overall efficiency. Depending on the embodiment, the control circuit may be implemented by a logic circuit or a controller including a processor. In the example of FIG. 1, control circuit 150 is a microcontroller (MCU), which receives operating power Vcc from a power supply terminal Vcc of converter 110. MCU 150 includes a processor 152 and provides control signals to regulator 120 for adjusting current flow in the LED strings. For example, MCU 150 provides dimming input signals DIM1, . . . , DIM4, etc. to the regulator, and enables independent control of each channel. MCU 150 also receives the output power status signal STATUS. The STATUS terminal of the regulator is coupled to the power supply terminal Vcc of converter 110 through resistor 115. Microcontroller 150 provides a DC output adjustment signal VDC_adj to increment or decrement feedback signal FB in response to the output power status signal, thereby to enable power converter 110 to adjust the output DC voltage. DC output adjustment signal VDC_adj is coupled to the feedback node FB through a diode 116 and a resistor 117

Figure 2:
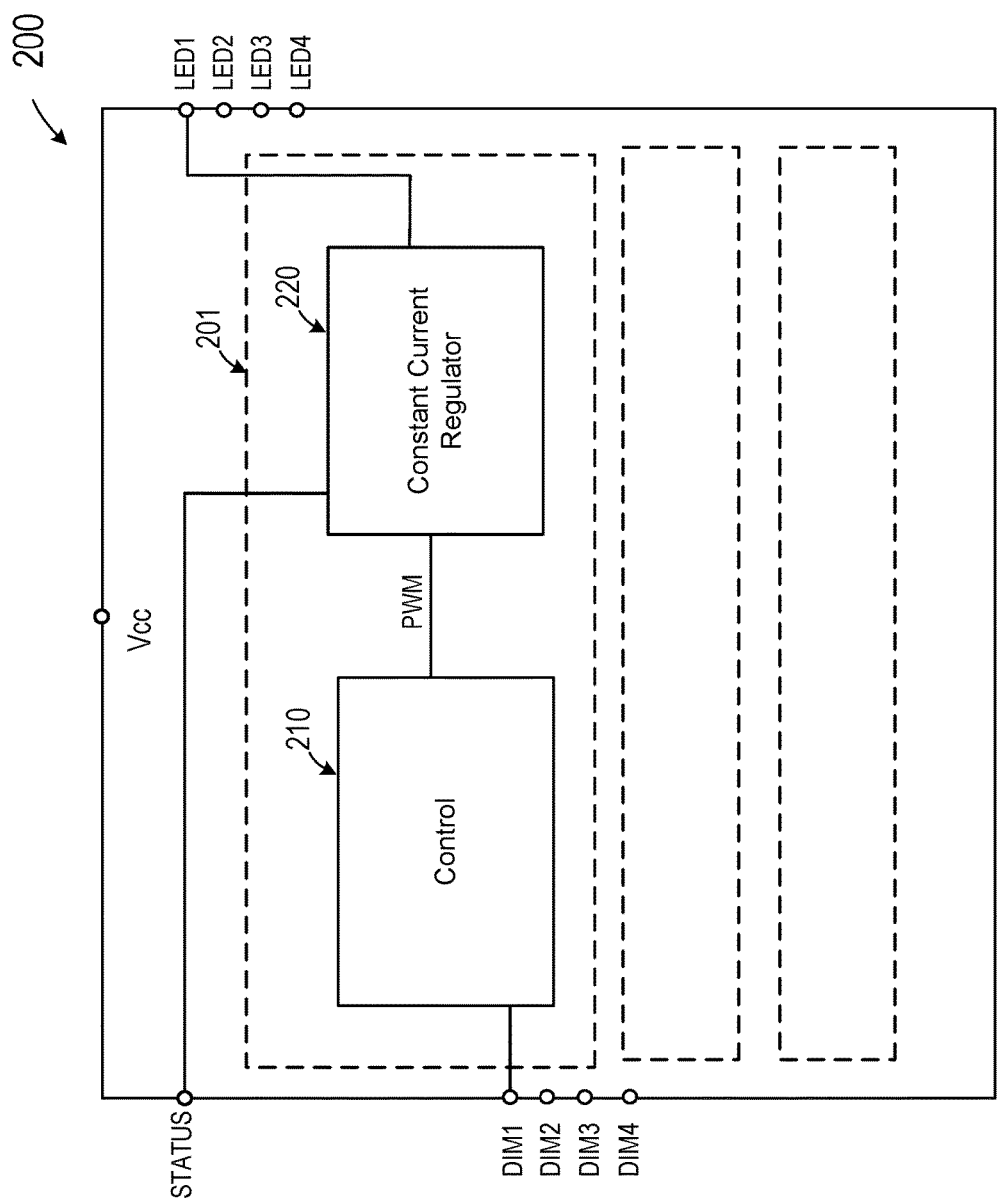
FIG. 2 is a simplified schematic diagram depicting a portion of a linear regulator in the power supply of FIG. 1 that embodies certain aspects of this invention.

FIG. 2 is a simplified schematic diagram depicting a portion of a linear regulator 200 that embodies certain aspects of this invention. Linear regulator 200 is an integrated linear regulator implemented in an integrated circuit (IC) chip, which is an example of a linear regulator that may be used in power supply 100. As shown in FIG. 2, linear regulator 200 has a power terminal Vcc for receiving a DC power supply, which may provide power for the LED lamp. As described above in FIG. 1, linear regulator 200 may have one or more channels for regulating the current flow in one or more LED strings. Only one channel 201 is shown in FIG. 2 for illustration purposes. Each channel includes an input terminal, e.g., DIM1, for receiving an input signal. In embodiments of the invention, the input signal may be either a digital input signal or an analog input signal. The input signal may be a dimming control signal. Alternatively, the input signal may carry other control information. Linear regulator 200 also has an output terminal, e.g., LED1, for each channel for coupling to an LED string of the LED lamp. Each channel regulates a current flow in the LED string based on the input signal. Linear regulator 200 also has a status terminal for providing an output power status signal.

As shown in FIG. 2, linear regulator 200 includes a control circuit 210 and a constant current regulator 220 in each channel. Control circuit 210 includes an input terminal for receiving an input signal, e.g., from terminal DIM1. In embodiments of the invention, the input signal may be either a digital input signal or an analog input signal, and control circuit 210 provides a digital control signal in response to the input signal. FIG. 2 illustrates a dimming control embodiment, in which the input signal from DIM1 is a dimming control signal, and control circuit 210 provides a digital control signal PWM to control the dimming of the LED string connected to terminal LED1. The input signal from DIM1 can be either an analog signal or digital pulse-width-modulation signal. The digital control signal PWM can be replaced with an analog control signal.

Figure 3:
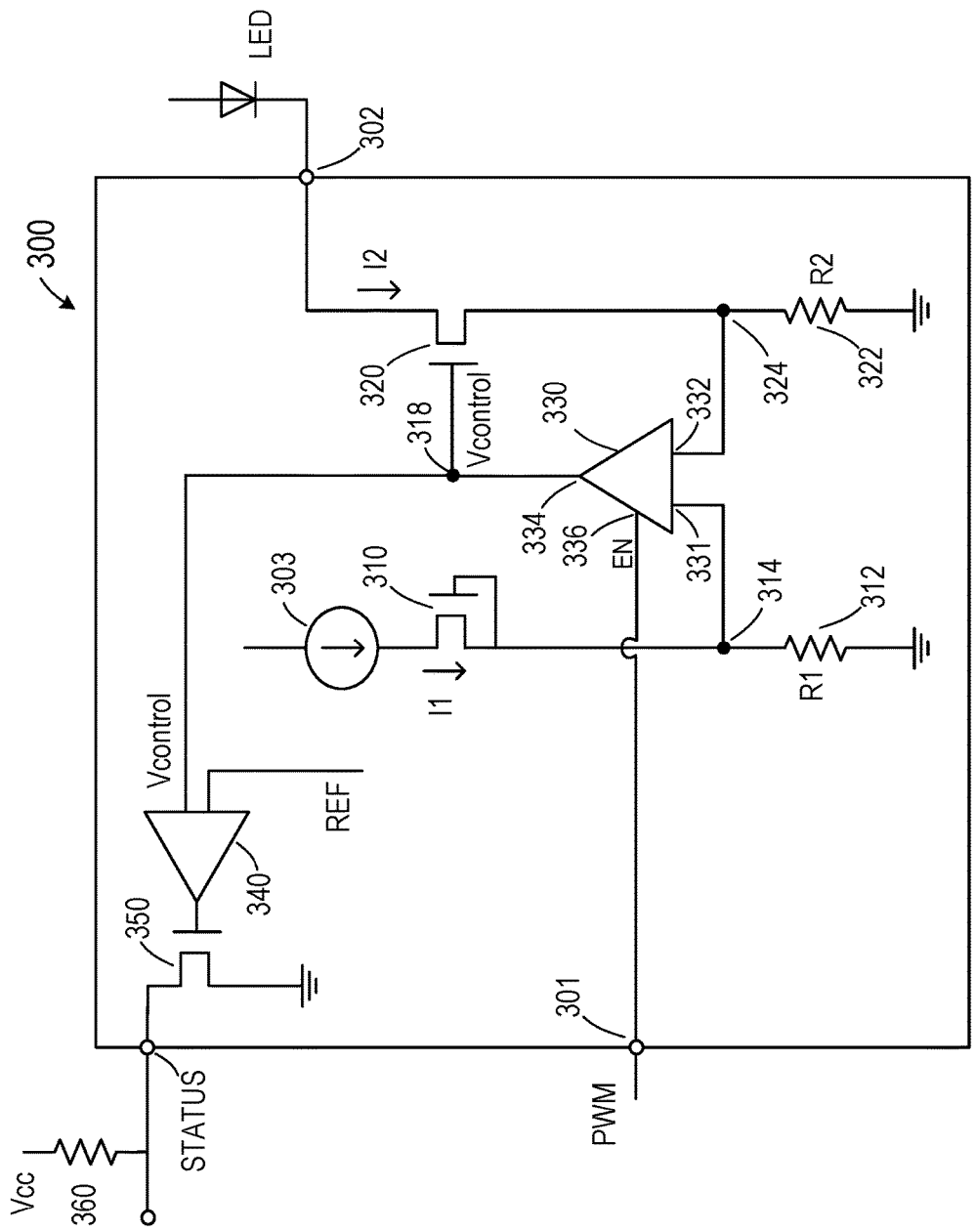
FIG. 3 is a simplified schematic diagram depicting a constant current regulator in the linear regulator of FIG. 2 that embodies certain aspects of this invention.

FIG. 3 is a simplified schematic diagram depicting a constant current regulator 300 that embodies certain aspects of this invention. Constant current regulator 300 is an example of regulators that may be used as constant current regulator 220 in FIG. 2. As shown in FIG. 3, constant current regulator 300 has an input terminal 301 for receiving a digital PWM signal and an output terminal 302 for coupling to an LED string to control the current flow in the LED string. In this example, constant current regulator 300 includes a constant current source 303 providing a current I1 and is coupled in series with a first NMOS transistor 310 and a first resistor 312. The first NMOS transistor 310 and first resistor 312 are connected at a first node 314. The output terminal 302 of constant current regulator 300 is coupled in series with a second NMOS transistor 320 and a second resistor 322. The second NMOS transistor 320 and the second resistor 322 are connected at a second node 324. Constant current regulator 300 also has an operational amplifier 330 that includes a first input 331 coupled to the first node 314 between the first NMOS transistor and the first resistor, and a second input 332 coupled to the second node 324 between the second NMOS transistor and the second resistor. Operational amplifier 330 also has an output 334 coupled to a node 318 that is connected to the gate of the second NMOS transistor 320. Operational amplifier 330 also has an enable node 336 (EN) coupled to the PWM control signal.

As shown in FIG. 3, operational amplifier 330 is part of a feedback loop that relates output current I2 to input current I1 under the control of the PWM signal at the enable node 336 (EN) of the operational amplifier. If the operational amplifier is enabled by the PWM signal at a high state, the voltage at the first node 314 is maintained equal to the voltage at the second node 324, and a current I2 flowing in the second NMOS transistor 320 is proportional to the current I1 of the constant current source 310 by factor n, where n is a ratio of the resistance of the first resistor R1 to the resistance of the second resistor R2. In other words, R1=n*R2 and I2=n*I1. If the PWM signal is low, operational amplifier 330 is turned off and, further, the second NMOS transistor 320 is also turned off, causing current I2 to be zero. Thus, the current provided at the output terminal to the LED string, I2, is controlled by the PWM control signal. The average current of I2 is proportional to the duty cycle of the PWM signal. Therefore, when the PWM signal is a dimming control signal, the brightness of the LED string is proportional to the duty cycle of the PWM dimming signal.

In this embodiment, constant current regulator 300 also has a comparator 340 with a first input terminal coupled to the output 318 of operational amplifier 330, a second input terminal coupled to a reference signal REF related to a desired output current for maintaining a proper operating margin, and an output terminal coupled to a gate of a third NMOS transistor 350. NMOS transistor 350 also has a source coupled to a ground, and a drain for coupling to the status terminal STATUS of the integrated linear regulator. NMOS transistor 350 is in an open-drain configuration for coupling to a power supply Vcc through an external load resistor 360.

In FIG. 3, reference signal REF is compared with the gate voltage of transistor 320 which controls the flow in the LED string. Reference signal REF is selected based on the desired current in the LED string. One advantage of sensing the gate voltage of transistor 320 versus the drain voltage is the ripple/glitch immunity, because the gate is inside a feedback loop which has a low-pass response. In contrast, the drain is outside the feedback loop and has less ripple or glitch immunity. By detecting the gate voltage, high frequency glitches or ripples may be filtered out, and better control of the power output status may be obtained.

Figure 4:
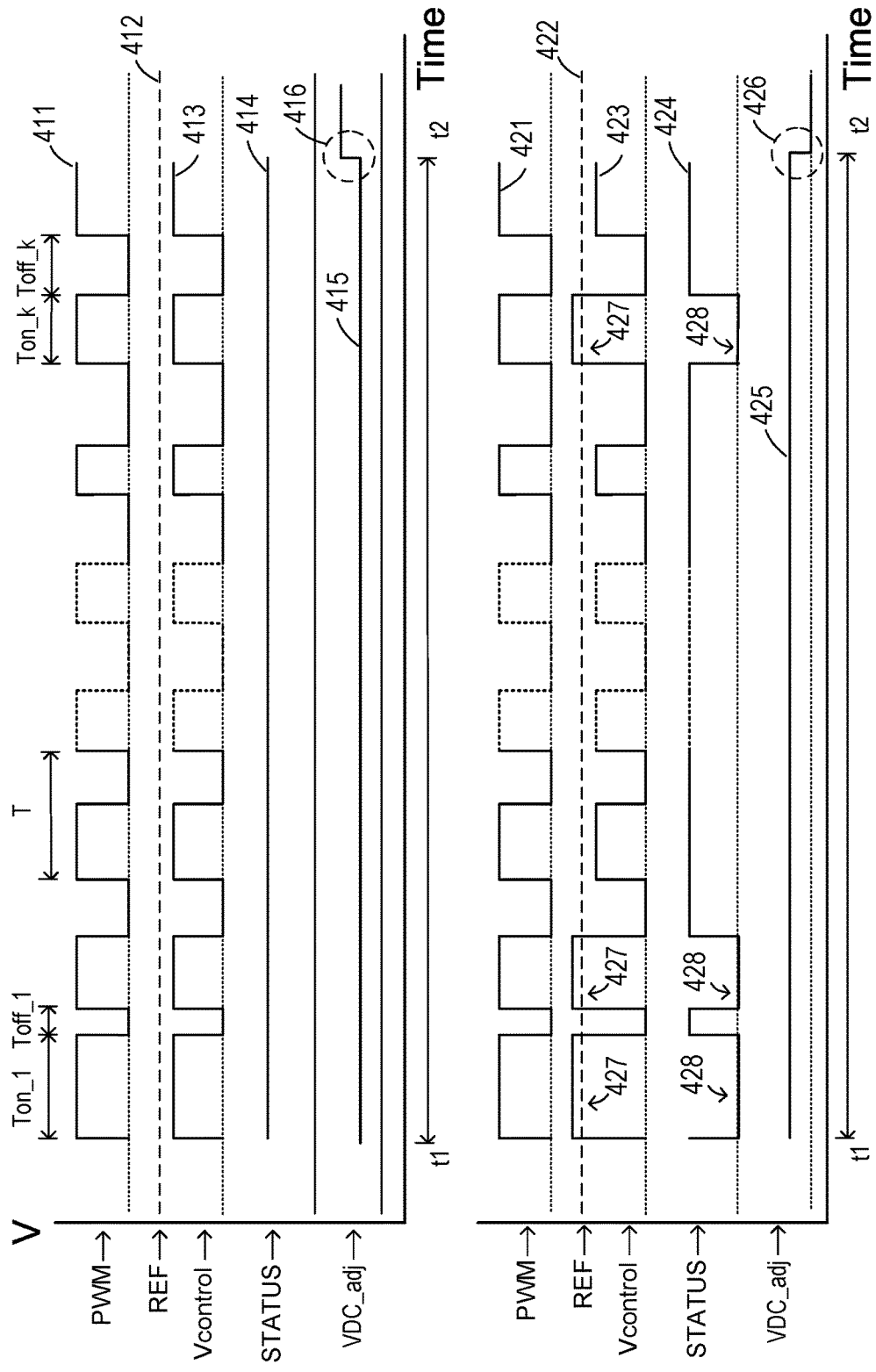
FIG. 4 is a simplified waveform diagram depicting a method for power optimization that embodies certain aspects of this invention.

FIG. 4 is a simplified waveform diagram depicting a method for power optimization that embodies certain aspects of this invention. The waveforms in FIG. 4 serve to illustrate an example of the linear regulator providing an output power status signal, which is used to regulate the DC output voltage of the power converter. FIG. 4 refers to signals depicted in FIGS. 1-3. The signals in the upper portion of FIG. 4 illustrate a scenario of raising the DC output voltage, and the signals in the lower portion of FIG. 4 illustrate a scenario of lowering the DC output voltage. As described above, constant-current regulator 300 is coupled to the control circuit to receive a PWM control signal and regulates a current in the LED string in response to a PWM control signal. As shown in FIG. 4, the PWM control signal 411 includes on-durations Ton_1, . . . , Ton_k, and off-durations Toff_1, . . . , Toff_K in each PWM switching cycle which has a period T. As shown in FIG. 3, when amplifier 330 is enabled by the PWM signal, the output 318 of the amplifier provides a control signal Vcontrol to control the gate of NMOS transistor 320 to regulate the current I2 in the LED string. Further, the Vcontrol signal is compared with a reference signal REF at comparator 340. The output of comparator 340 is coupled to the gate of NMOS transistor 350, and the drain terminal is coupled to the STATUS terminal of the linear regulator. Reference signal REF is selected based on a desirable current in the LED string. Reference signal REF may be determined empirically or by simulation. Alternatively, MCU 150 may select an appropriate REF for different temperatures or loading conditions. Thus, the integrated linear regulator provides the output power status signal STATUS, which is used by control circuit or MCU 150 in FIG. 1 to regulate DC output voltage Vin of power converter 110.

In FIG. 4, signals 411, 412, 413, and 414 designate the PWM, REF, Vcontrol, and STATUS signals, respectively. In this embodiment, the output power status signal STATUS is a logic signal, which may be either in a first state or a second state. Depending on the implementation, the first or second state may designate either a logic high or a logic low state. During each PWM on-duration, Ton_1, . . . , Ton_k, when the amplifier is enabled, the output power status signal is in the first state if the current in any one of the LED strings is above a target current in that LED string, and the output power status signal is in the second state if the current in that LED string is below the target current in that LED string. In the upper portion FIG. 4, the Vcontrol signal 413 is below reference signal REF 412 during all the on durations of the PWM signal. As a result, the STATUS signal 414 stays high. In the lower portion of FIG. 4, a different scenario is illustrated, where signals 421, 422, 423, and 424 designate the PWM, REF, Vcontrol, and STATUS signals, respectively. However, Vcontrol signal 423 is higher than reference signal REF 422, in PWM on-durations marked by 427. As a result, the STATUS signal 424 is in the low state in PWM on-durations marked by 428.

In a multi-channel implementation, the linear regulator may have multiple constant current regulators, one for each channel, and each channel provides a power status signal at the drain of an NMOS transistor, e.g., transistor 350 in FIG. 3. The multiple drain terminals are coupled together at the STATUS terminal of the linear regulator. Therefore, the output power status signal at STATUS is in the first state if the current in any one of the LED strings is above a target current in that LED string, and the output power status signal is in the second state if the current in that LED string is below the target current in that LED string. Of course, depending on the implementation, the designations of "above" and "below" and "first state" and "second state" may be rearranged.

FIG. 4 also shows an output adjustment signal VDC_adj, which is provided by control circuit or microcontroller MCU in FIG. 1 to the power converter 110. As described above, microcontroller MCU (150) is coupled to the power converter and the regulator. The microcontroller sends signal VDC_adj to the power converter to increment or decrement the feedback signal FB in response to the output power status signal, thereby to enable the power converter to adjust the output DC voltage Vin of the power converter. As shown in FIG. 4, MCU 150 monitors the STATUS signal over a period of time, e.g., from t1 to t2. If the STATUS signal stays high through this period of time, MCU 150 increments the VDC_adj signal 415 at time t2, as shown in a circle 416. However, if the STATUS signal is low at any time during this period, as shown in the switching cycles marked by 428, MCU 150 decrements the VDC_adj signal 425, as shown in a circle 426 at time t2. As shown in FIG. 1, the VDC adj signal is added to the FB signal to enable the power converter to adjust the output DC voltage Vin. The length of time period between t1 and t2 may be selected based on desired frequency of power adjustment and the power consumption associated with more frequent adjustment. In a specific embodiment, the time period between t1 and t2 is 10 msec.

Figure 5:
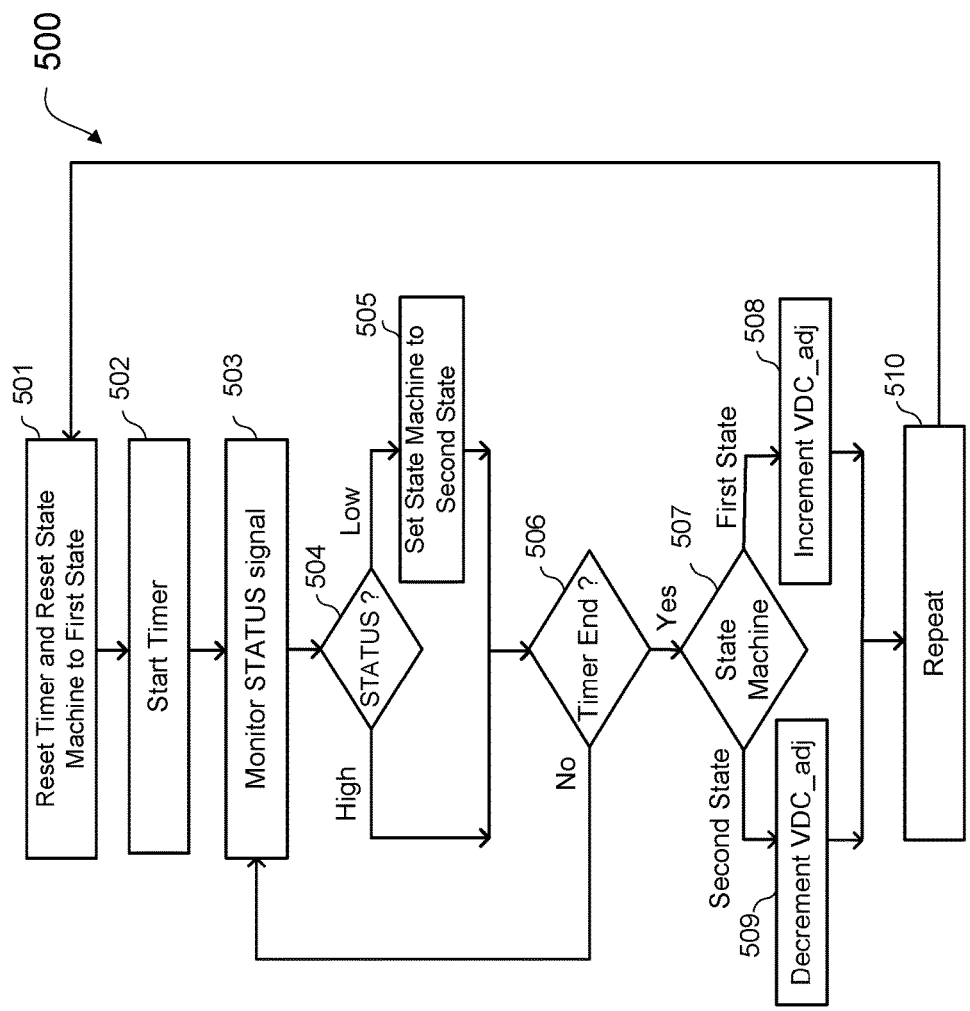
FIG. 5 is a simplified flowchart depicting a method for power optimization that embodies certain aspects of this invention.

FIG. 5 is a simplified flowchart depicting a method 500 for power optimization that embodies certain aspects of this invention. This method may be carried out by the power supply depicted in FIG. 1. The steps depicted in FIG. 5 may be implemented in hardware, or may be coded in software and executed by processor 152 in MCU 150. The processor monitors the output power status signal STATUS over a given period of time as controlled by a timer, and a state machine is used to keep track of the output power status signal. The MCU provides the output adjustment signal VDC_adj to the power converter based on the state of the state machine. Method 500 may be summarized below.

Step 501: Reset the timer and reset the state machine to a first state;

Step 502: Start the timer to count down from the pre-set time duration;

Step 503: Monitor the output power status signal STATUS;

Step 504: Check if the STATUS signal is low in any of the PWM switching cycles in the per-set time duration;

Step 505: If the STATUS signal is low, set the state machine to a second state;

Step 506: If the timer has expired, move to Step 507, and if not, repeat Steps 503-505;

Step 507: Check the state of the state machine;

Step 508: If the state machine is in the first state, increment the output adjustment signal VDC_adj;
Step 509: If the state machine is in the second state, decrement the output adjustment signal VDC_adj;
Step 510: Repeat the above process from Step 501.

MCU 150 may include a digital-to-analog converter (DAC) to convert an internal digital signal to analog signal VDC_adj, which is sent to the feedback terminal of the power converter to regulate the DC output voltage. In an embodiment, an MCU may determine an appropriate action to adjust pre-regulator output voltage for different temperatures and loading operating conditions. As a result, the DC output voltage provided to the linear regulator will be just enough to maintain low dropout voltage required by the Regulator. This closed-loop controllable action may be real-time for its different low dropout voltage at different loading and temperature conditions. With this real-time dynamic adjustment, the system will provide the most suitable DC voltage for the regulator to maintain regulation action at reduced power consumed by the regulator and improve the overall efficiency. Another advantage of the power optimization method described above is that the microcontroller may be programmed to provide flexible control of LED lamps having multiple LED strings, for example, for adjusting the current differently in each LED string for color and brightness matching.

This controllable action may also be adjusted in a one-time calibration phase to compensate for process variation from the components. With this simplified scheme, a simpler control circuit other than an MCU may also be used. For example, method 500 may be implemented using a control circuit which may include logic circuits, a timer, a counter, a state machine, and a DAC, etc.

Figure 6:
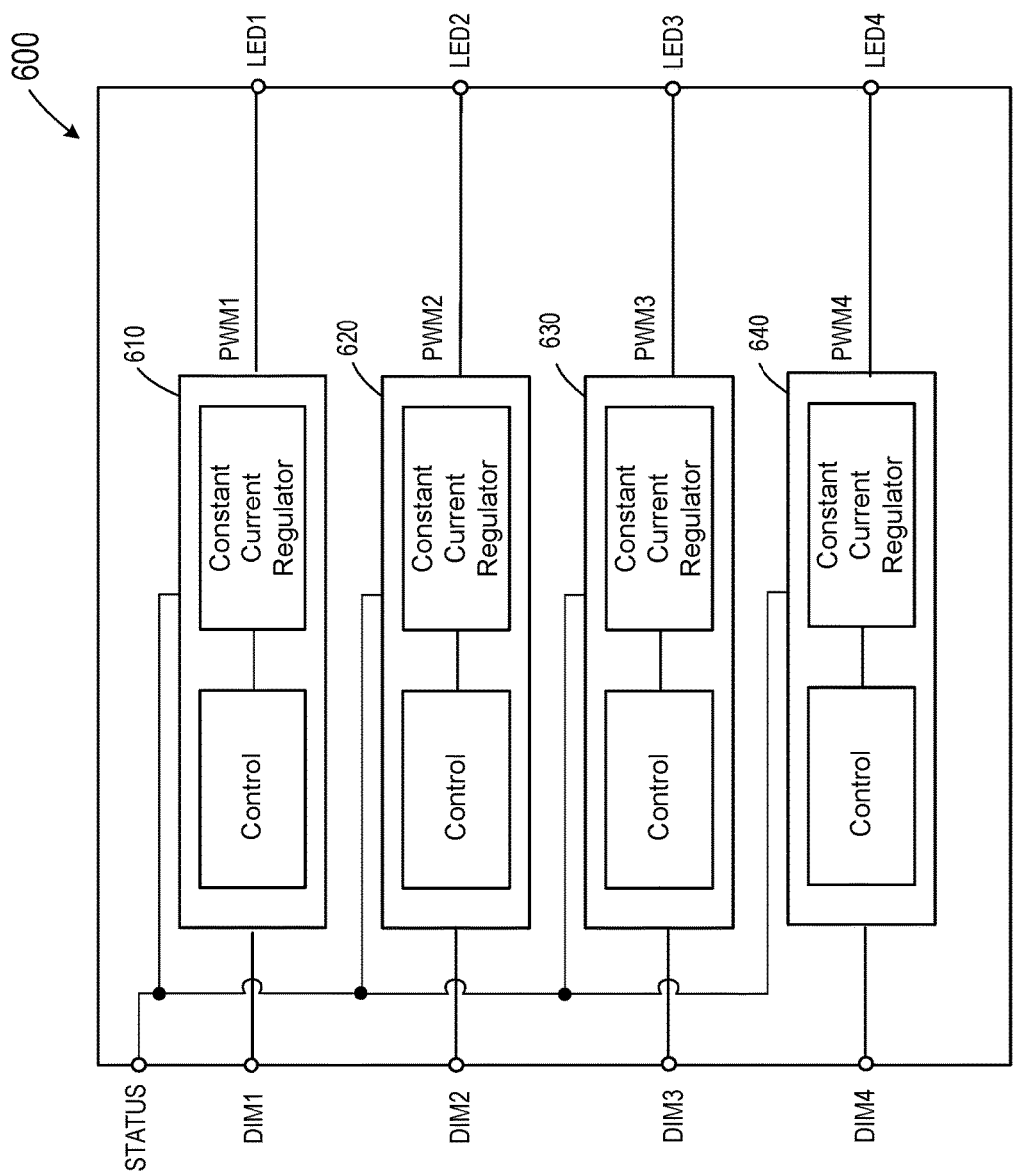
FIG. 6 is a simplified schematic diagram depicting a multiple channel linear regulator that embodies certain aspects of this invention.

FIG. 6 is a simplified schematic diagram depicting a multiple-channel linear regulator that embodies certain aspects of this invention. As shown in FIG. 6, linear regulator 600 includes four channels, 610, 620, 630, and 640, and may be used as regulator 120 in the LED driving system in FIG. 1. The channels have output terminals LED1, . . . , LED4, respectively, coupled to LED strings of the LED lamp, and regulate a current flow in the LED strings. The channels also have input terminals, DIM1, . . . , DIM4, respectively, for receiving dimming input signals. Each channel includes a control circuit that is similar to dimming control circuit 210 in FIG. 2. Each channel also has a constant current regulator that is similar to constant current regulator 220 in FIG. 2. Each channel provides a power status signal to terminal STATUS, as described above in connection to the constant current regulator in FIG. 2. In this embodiment, each channel has a separate dimming control. However, a single dimming control circuit may be used to control more than one channel, or all the channels.

The forward voltage (Vf) for LED load at given current highly depends on temperature. Typical LEDs have temperature coefficients ranging from −2 mV/C to −6 mV/C. Given 100 degrees of operating temperature range, Vf for each LED can drop a few hundreds of millivolts. The nature of negative temperature coefficient makes the above-mentioned drop-out voltage even harder to control at optimal condition. This invention also teaches an LED control circuit that provides efficient power supply voltage management to the linear regulators. The circuit adjusts the input voltage of the regulator dynamically based on the feedback of the regulator to provide just enough dropout voltage can solve the problem to optimize the input power at different operating condition. The circuit can be implemented with a comparator, a digital counter, and a digital-to-analog converter (DAC), which is simpler than a microcontroller. In an embodiment, the voltage at one end of an LED string is sampled and compared with a desired headroom target voltage. Depending on the result of comparison, a digital counter is either incremented or decremented. The output of the counter is converted to an analog current signal by a digital-to-analog converter (DAC). The analog current signal is fed to a resistive voltage divider coupled to a feedback terminal (FB) of the main power supply.

Figure 7:
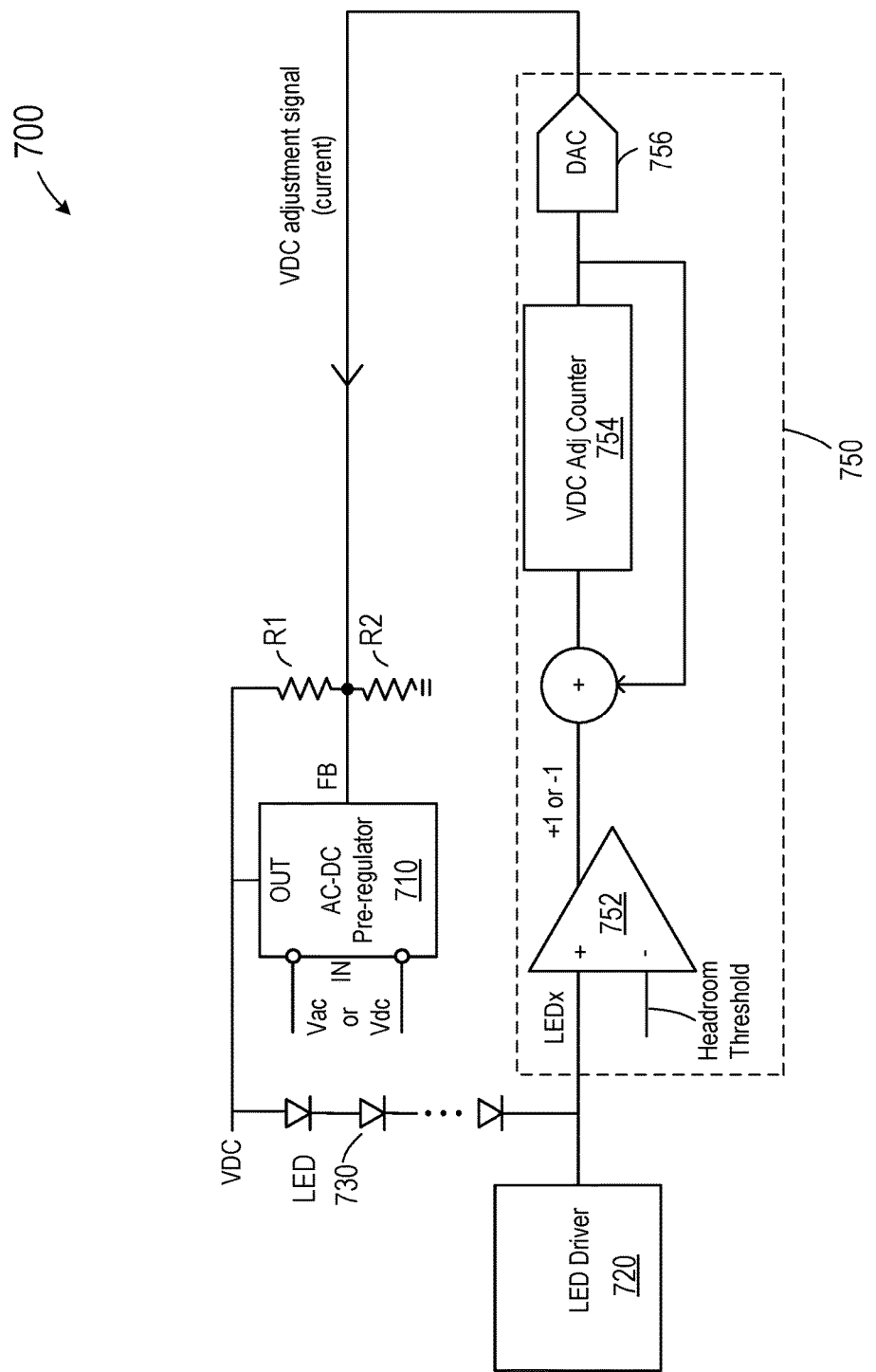
FIG. 7 is a simplified schematic diagram depicting a power supply for driving an LED string that embodies certain aspects of this invention.

FIG. 7 is a simplified schematic diagram depicting a power supply for driving an LED string that embodies certain aspects of this invention. A pre-regulator 710 is a controllable voltage regulator that takes AC or DC input and generates a VDC output for the linear regulator 720. The control circuit determines if the VDC has enough headroom for the dropout and send a "VDC Adjustment Signal" to the feedback node FB of the controller for the pre-regulator that controls the output voltage of the pre-regulator. Then the pre-regulator will output a voltage good for different temperature and loading condition while not providing unnecessarily high voltage level. As a result the VDC provided to the linear regulator will be optimized. FIG. 7 shows a closed-loop controllable action that can be real-time for its different minimum dropout voltages at different loading and temperature conditions. With this real-time dynamic adjustment, the system can provide the most suitable VDC for the Regulator to guarantee the correct regulation action at minimum power consumed by the Regulator and improve the overall efficiency.

FIG. 7 shows a power supply 700 for driving an LED (light-emitting diode) string 730. The power supply includes a power converter 710, also referred to as a pre-regulator, that includes power input nodes IN coupled to an input voltage, an output node OUT coupled to a first end of the LED string, and a feedback node FB for receiving a feedback signal from a voltage divider coupled to the output node. The voltage divider includes a first resistor R1 and a second resistor R2. The power converter is configured to convert the input voltage, which can be a AC or DC voltage source, to a target output DC voltage, VDC, in response to the feedback signal. Power supply 700 also has a regulator circuit 720, also referred to as an LED driver, coupled to the power converter and the LED string. Regulator circuit 720 can be a linear regulator. The regulator circuit has an output terminal coupled to a second end of LED string 730 for regulating a current in the LED string. Power supply circuit 700 also includes a headroom control circuit 750, which can include a comparator circuit 752, a digital counter circuit 754, and a current output DAC (current-mode digital-to-analog converter) 756. Comparator circuit 752 has a positive input coupled to an output terminal of the regulator circuit and a negative input coupled to a headroom threshold voltage reference. Digital counter circuit 754 is coupled to the comparator circuit and is configured to increment or decrement its output based on a signal from the comparator. Current output DAC 756 is coupled to the output of the digital counter circuit and configured to output a DC voltage adjustment current signal VDC to the voltage divider. The power converter is configured to maintain the voltage at the feedback node at an internal feedback reference voltage to provide the target output DC voltage to the LED string, The headroom adjustment circuit is configured to maintain a desired headroom in the voltage supply to the LED string according to the DC voltage adjustment current signal from the DAC.

Figure 8:
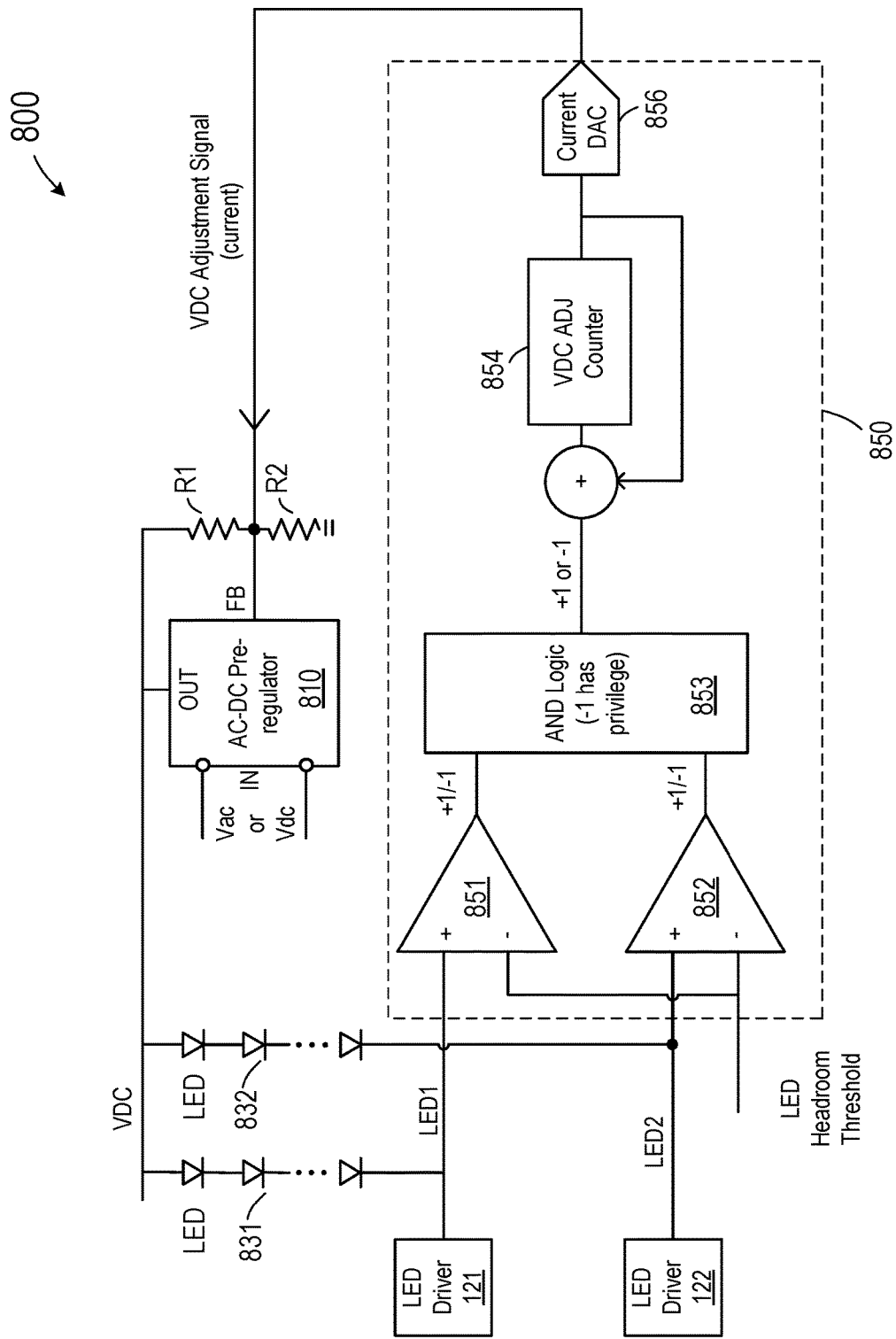
FIG. 8 is a simplified schematic diagram depicting a power supply for driving multiple LED strings that embodies certain aspects of this invention.

FIG. 8 is a simplified schematic diagram depicting a power supply for driving multiple LED strings that embodies certain aspects of this invention. As shown in FIG. 8, power supply 800 is configured to driving two LED strings, 831 and 832, but the design can be extended to 3 or more LED strings. Power supply 800 includes a power converter 810, also referred to as a pre-regulator, that includes power input nodes IN coupled to an input voltage, an output node OUT coupled to the first end of each LED strings, and a feedback node FB for receiving a feedback signal from a voltage divider coupled to the output node. The voltage divider includes a first resistor R1 and a second resistor R2. The power converter is configured to convert the input voltage to a target output DC voltage, VDC, in response to the feedback signal. Power supply 800 also has regulator circuits coupled to the power converter and 832, respectively. As shown in FIG. 8, each of the regulators, e.g., 821 and 822 have output terminals, e.g., LED1 and LED2, coupled to the second end of each LED strings for regulating a current in the LED string. Power supply circuit 800 also includes a headroom control circuit 850.

In FIG. 8, headroom control circuit 850 includes a comparator for each LED string with a positive input coupled to the second end of the LED string and a negative input coupled to a headroom threshold voltage reference for the LED strings. In FIG. 8, comparator 851 and 852 are coupled to second ends LED1 and LED2 of LED strings 831 and 832, respectively. In FIG. 8, a single LED headroom threshold voltage reference is used for both LED strings. Alternatively, each LED string can have a separate headroom threshold reference. An AND logic circuit 853 receives the outputs of each comparator and provides a digital output signal indicating if any of the comparators has a low output. A digital counter circuit 854 is coupled to the AND logic circuit and is configured to increment or decrement its output count based on the output of the AND logic circuit. A current output DAC (current-mode digital-to-analog converter) 856 is coupled to the output of the digital counter circuit and configured to output a VDC voltage adjustment signal to the feedback node FB of the power converter. The power converter is configured to maintain the voltage at the feedback node at an internal feedback reference voltage to provide the target output DC voltage to the LED strings. The headroom adjustment circuit is configured to maintain a desired headroom in the voltage supply to the LED strings according to the output of the DAC.

Figure 9:
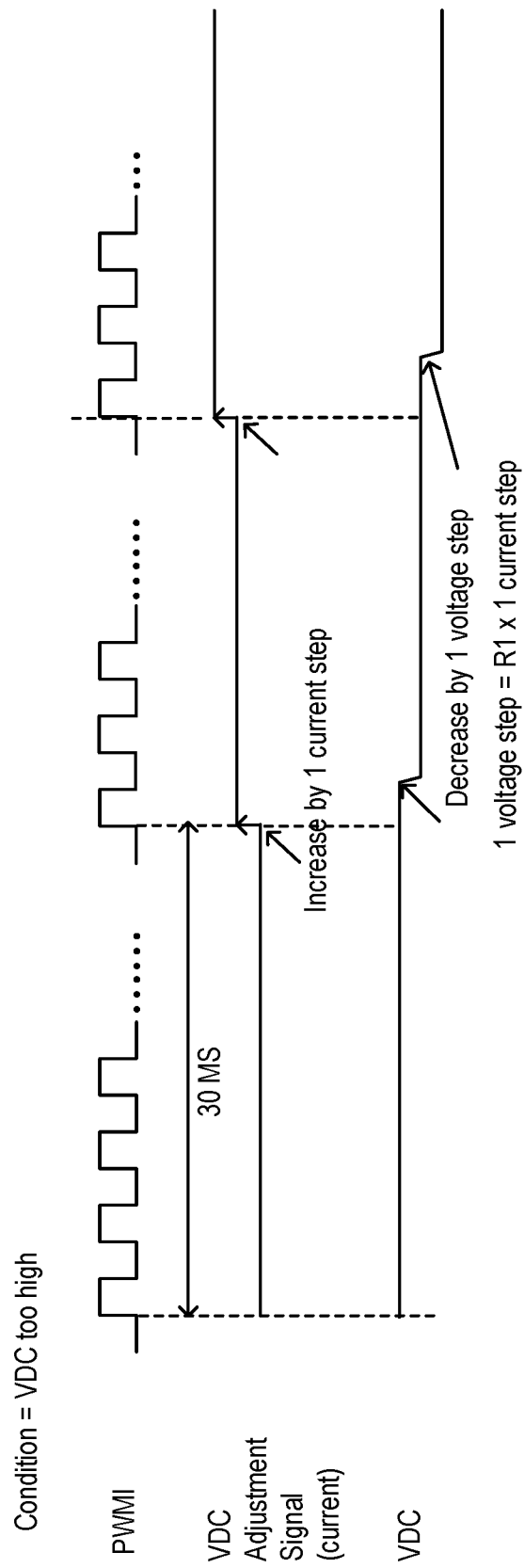
FIG. 9 is a simplified waveform diagram depicting a method for power optimization that embodies certain aspects of this invention.

FIG. 9 is a simplified waveform diagram depicting a method for power optimization that embodies certain aspects of this invention. FIG. 9 illustrate waveforms that depict control action of the headroom adjustment circuit in FIG. 7. As shown, signal PWMI is a PWM control signal input to LED driver 720, which can be a linear regulator. PWMI is used as a timing signal to determine the frequency of the control actions of the headroom adjustment circuit. In this particular example, the time interval is 30 msec, which can be varied for different operations. In FIG. 9, illustrates the scenario in which the VDC voltage to the LED strings has been determined to be too high, i.e., higher than the LED headroom threshold reference signal by comparator 752. At every 30 msec, digital counter 754 is incremented by one step in response to the comparator output and the timing control from the PWMI signal. As the counter is incremented, its output is converted to an analog current signal, the VDC adjustment signal, by DAC 756. This current signal is provided to voltage divider R1 and R2, which are connected at the FB node. As a result, the VDC voltage at the top of R1 is reduced by an amount determined by R1 times one current step changed by the digital counter. This process is continued until the desired headroom voltage is reached.

Figure 10:
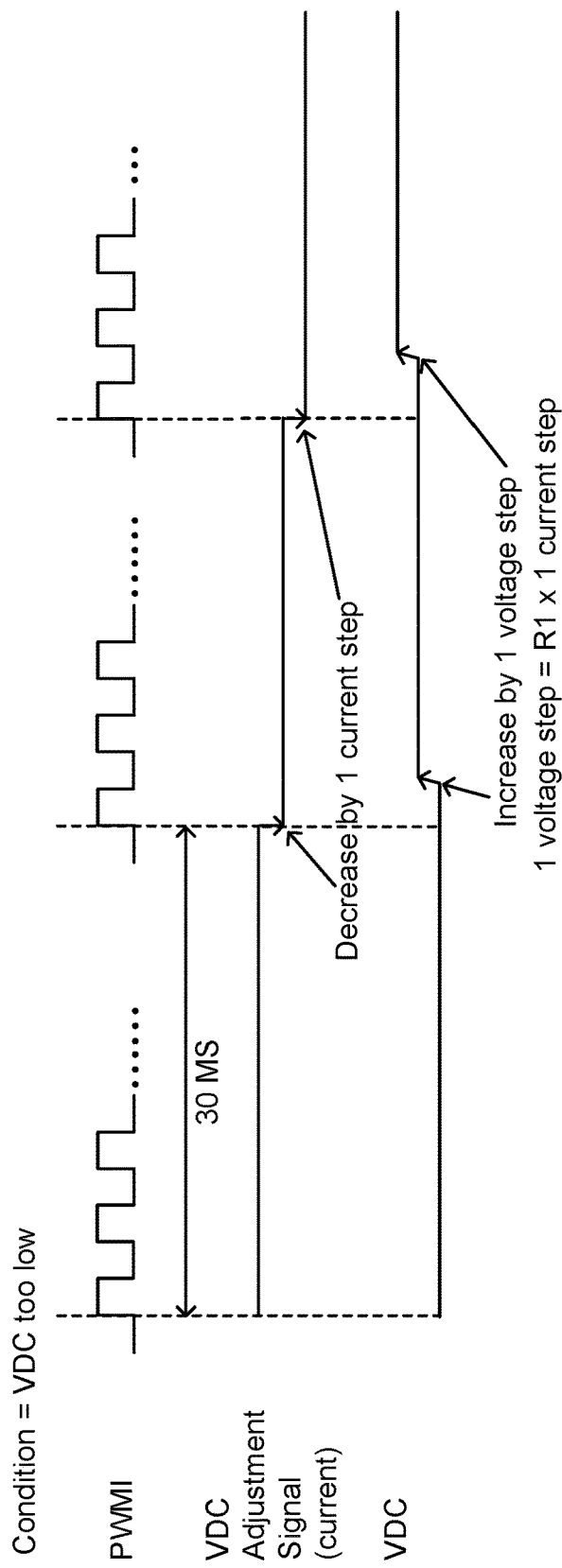
FIG. 10 is a simplified waveform diagram depicting a method for power optimization that embodies certain aspects of this invention.

FIG. 10 is a simplified waveform diagram depicting a method for power optimization that embodies certain aspects of this invention. FIG. 10 illustrates waveforms that depict control action of the headroom adjustment circuit in FIG. 7 in the scenario in which the VDC voltage to the LED strings has been determined to be too low, i.e., lower than the LED headroom threshold reference signal by comparator 752. At every 30 msec, digital counter 754 is decremented by one step in response to the comparator output and the timing control from the PWMI signal. As the counter is decremented, its output is converted to an analog current signal, the VDC adjustment signal, by DAC 756. This current signal is provided to voltage divider R1 and R2, which are connected at the FB node. As a result, the VDC voltage at the top of R1 is increased by an amount determined by R1 times one current step. This process is continued until the desired headroom voltage is reached.

Figure 11:
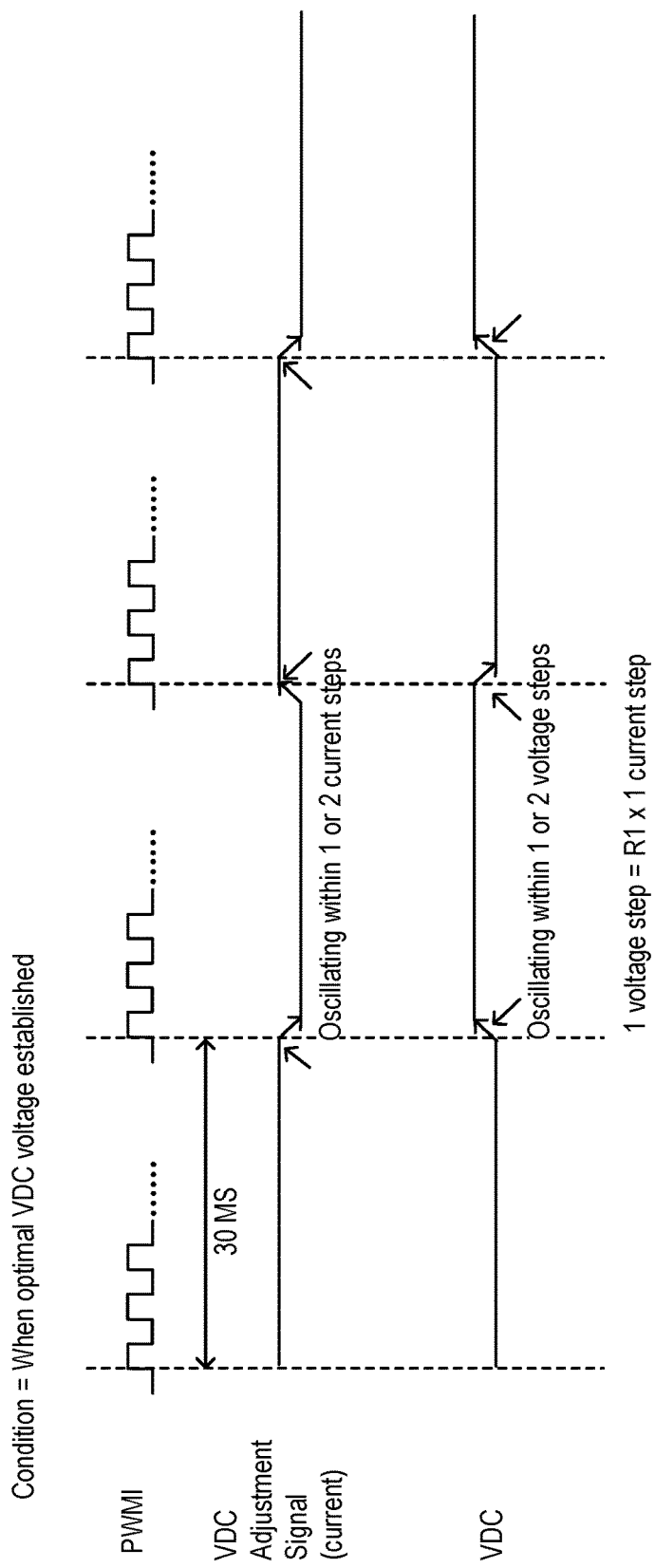
FIG. 11 is a simplified waveform diagram depicting a method for power optimization that embodies certain aspects of this invention.

FIG. 11 is a simplified waveform diagram depicting a method for power optimization that embodies certain aspects of this invention. FIG. 11 illustrates waveforms that depict control action of the headroom adjustment circuit in FIG. 7, in the scenario in which the optimal VDC voltage to the LED strings with the desired headroom voltage has been established. In this case, the VDC adjustment signal is alternately decremented and incremented every 30 msec to maintain VDC at the optimal voltage.

What is claimed is:
1. A power supply, comprising:
 a power converter configured to convert an input voltage to a target output DC voltage in response to a feedback signal, the feedback signal having a value;
 a regulator coupled to the power converter and configured to generate an output power status signal, which is configured to be in one of two states depending whether an output current from the regulator is above or below a target current over a preset time duration; and
 a control circuit coupled to the power converter and to the regulator and configured to increment or decrement the value of the feedback signal depending on the state of the power status signal; wherein:
 the power converter includes:
  a power input node coupled to receive an input voltage;
  an output node coupled to a first end of each of a plurality of LED strings; and
  a feedback node for receiving the feedback signal from the output node; and
 the regulator circuit includes a plurality of channels, each channel having a control circuit and a constant-current regulator which is coupled to a second end of a respective one of the LED strings for regulating a current in the LED string;
  wherein the regulator circuit is configured to provide an output power status signal that is either in a first state or a second state;
  wherein, the output power status signal is set in the first state if the current in any one of the LED strings is above a target current for that LED string, and the output power status signal is set in the second state if the current in that LED string is below the target current in that LED string.
2. The power supply of claim 1, wherein:
 wherein each constant-current regulator in the regulator circuit is coupled to a second end of a respective one of the LED strings for regulating a current in the LED string in response to a PWM (pulse mode modulation)

control signal, the PWM control signal including an on-duration and an off-duration in each PWM switching cycle;

the control circuit is configured to monitor the output power status signal for a selected period of time;

the control circuit is configured to increment the feedback signal if the output power status signal is in the first state during any PWM switching cycle in the selected period of time; and the control circuit is configured to decrement the feedback signal if the output power status signal is in the second state during all PWM switching cycles in the selected period of time.

3. The power supply of claim 2, wherein the control circuit comprises:

a timer and a state machine for monitoring the output power status signal in each selected period of time;

a counter for representing and changing a digital value of the output adjustment signal;

a DAC (digital to analog converter) for converting the digital value to an analog signal; and an output terminal for sending an output adjustment signal to the feedback node of the power converter.

4. The power supply of claim 2, wherein the control circuit comprises a microcontroller that is programmed to monitor the output power status signal and to send an output adjustment signal to the power converter once in each of the selected period of time.

5. The power supply of claim 1, wherein the constant current regulator comprises:

an input node for receiving the PWM control signal;

a constant current source coupled in series with a first NMOS transistor and a first resistor;

an output node coupled in series with a second NMOS transistor and a second resistor; and an operational amplifier having:
  a first input coupled to a first node between the first NMOS transistor and the first resistor;
  a second input coupled to a second node between the second NMOS transistor and the second resistor;
  an output coupled to a gate of the second transistor; and
  an enable node coupled to the PWM control signal;

a comparator, having:
  a first input coupled to the output of the operational amplifier;
  a second input coupled to a reference signal related to an desired output current; and
  an output;

a third NMOS transistor, having:
  a gate coupled to the output of the comparator;
  a source coupled to a ground; and
  a drain configured for coupling to the status terminal of the regulator circuit.

6. A power supply for driving a plurality of LED (light-emitting diode) strings, the power supply comprising:

a power converter, including:
  a power input node coupled to an input voltage;
  an output node coupled to a first end of each of the plurality of LED strings; and
  a feedback node for receiving a feedback signal from the output node;
  wherein the power converter is configured to convert the input voltage to a target output DC voltage in response to the feedback signal;

a multi-channel regulator circuit coupled to the power converter and the plurality of LED strings, the regulator circuit including a plurality of channels;

wherein each channel is coupled to a second end of a respective one of the LED strings for regulating a current in the LED string in response to a PWM (pulse mode modulation) control signal, the PWM control signal including an on-duration and an off-duration in each PWM switching cycle;

wherein the regulator circuit is configured to provide an output power status signal that is either in a first state or a second state;

wherein, the output power status signal is set in the first state if the current in any one of the LED strings is above a target current value for that LED string during the PWM on-duration in the PWM switching cycle, and the output power status signal is set in the second state if the current in that LED string is below the target current value for that LED string; and a microcontroller coupled to the power converter and the regulator, the microcontroller including a processor and is configured to monitor the output power status signal for a selected period of time, and to increment or decrement the feedback signal in response to the output power status signal, thereby to enable the power converter to reduce or increase the output DC voltage.

7. The power supply of claim 6, wherein:

the microcontroller is configured to increment the feedback signal if the output power status signal is in the first state during any PWM switching cycle in a selected period of time; and the microcontroller is configured to decrement the feedback signal if the output power status signal is in the second state during all PWM switching cycles in the selected period of time.

8. The power supply of claim 7, wherein the processor in the microcontroller is programmed to monitor the output power status signal and to send an output adjustment signal to the power converter once in each of the selected periods of time.

9. The power supply of claim 6, wherein the regulator circuit comprises:

a power terminal for receiving a DC power supply from the power converter;

an input terminal for each channel for receiving an input signal;

an output terminal for each channel for coupling to the second end of an LED string; and a status terminal for providing the output power status signal;

wherein each channel includes a control circuit and a constant-current regulator, and the control circuit is coupled to the input terminal and is configured to receive the input signal and to provide the PWM control signal to the constant-current regulator.

10. The power supply of claim 9, wherein the constant current regulator comprises:

an input node for receiving the PWM control signal;

a constant current source coupled in series with a first NMOS transistor and a first resistor;

an output node coupled in series with a second NMOS transistor and a second resistor; and an operational amplifier having:
  a first input coupled to a first node between the first NMOS transistor and the first resistor;
  a second input coupled to a second node between the second NMOS transistor and the second resistor;
  an output coupled to a gate of the second transistor; and
  an enable node coupled to the PWM control signal;

a comparator, having:
  a first input coupled to the output of the operational amplifier;
  a second input coupled to a reference signal related to a desired output current; and
  an output;
a third NMOS transistor, having:
  a gate coupled to the output of the comparator;
  a source coupled to a ground; and
  a drain configured for coupling to the status terminal of the regulator circuit.

11. The power supply of claim 10, further comprising a resistor load coupled to the status terminal of the regulator circuit, the resistor load being configured to provide a load for the drain of the third NMOS transistors in each channel.

12. The power supply of claim 10, wherein, when the operational amplifier is enabled by the PWM signal, a voltage at the first node is equal to a voltage at the second node, and a current flowing in the second NMOS transistor is proportional to a current of the constant current source by factor n, where n is a ratio of the resistances of the first resistance to the second resistance.

13. The power supply of claim 6, further comprising a voltage divider having two resistors coupled from the output node of the power converter to a ground, wherein a node between the two resistors is coupled to the feedback node of the power converter.

14. The power supply of claim 6, further comprising a diode and a resistor coupled in series between the microcontroller and the feedback node of the power converter to provide the output power status signal.

15. An integrated linear regulator for regulating current flow in an LED (light emitting diode) load having one or more LED strings, the integrated linear regulator comprising:
  a power terminal for receiving a DC power supply, the DC power supply also coupled to a first end of the one or more LED strings to provide power for the LED strings;
  one or more channels for regulating a current in each of the one or more LED strings;
  an input terminal for each channel for receiving an input signal;
  an output terminal for each channel for coupling to a second end of an LED string;
  a status terminal for providing an output power status signal;
  wherein each channel includes:
    a control circuit coupled to the input terminal and configured to receive the input signal and to provide a PWM (pulse mode modulation) control signal;
    a constant-current regulator coupled to the control circuit and the output terminal for regulating a current in the LED string in response to a PWM control signal, the PWM control signal including an on-duration and an off-duration in each PWM switching cycle;
  wherein the integrated linear regulator is configured to provide the output power status signal that is either in a first state or a second state;
  wherein, during the PWM on-duration in each PWM switching cycle, the output power status signal is in the first state if the current in any one of the LED strings is above a target current in that LED string, and the output power status signal is in the second state if the current in that LED string is below the target current in that LED string.

16. The integrated linear regulator of claim 15, wherein each of the constant current regulators comprises:
  an input node for receiving the PWM control signal;
  a constant current source coupled in series with a first NMOS transistor and a first resistor;
  an output terminal coupled in series with a second NMOS transistor and a second resistor; and
  an operational amplifier having:
    a first input coupled to a first node between the first NMOS transistor and the first resistor;
    a second input coupled to a second node between the second NMOS transistor and the second resistor;
    an output coupled to a gate of the second transistor; and
    an enable node coupled to the PWM control signal;
  a comparator, having:
    a first input terminal coupled to the output of the operational amplifier;
    a second input terminal coupled to a reference signal related to a desired output current; and
    an output terminal;
  a third NMOS transistor, having:
    a gate coupled to the output of the comparator;
    a source coupled to a ground; and
    a drain configured for coupling to the status terminal of the integrated linear regulator.

17. The integrated linear regulator of claim 15, wherein the status terminal is configured for coupling to an external resistor load.

18. The integrated linear regulator of claim 15, wherein the input signal is a dimming signal.

19. The integrated linear regulator of claim 15, wherein the reference signal related to a desired output current is derived empirically.

20. The integrated linear regulator of claim 15, wherein the reference signal related to a desired output current is derived using circuit simulation.

21. A power supply for driving an LED (light-emitting diode) string, the power supply comprising:
  a power converter, including:
    a power input node coupled to an input voltage;
    an output node coupled to a first end of the LED string; and
    a feedback node for receiving a feedback signal from a voltage divider coupled to the output node, the voltage divider having a first resistor and a second resistor;
    wherein the power converter is configured to convert the input voltage to a target output DC voltage in response to the feedback signal;
  a regulator circuit coupled to the power converter and the LED string, the regulator circuit has an output terminal coupled to a second end of the LED string for regulating a current in the LED string; and
  a headroom control circuit, comprising:
    a comparator circuit with a positive input coupled to an output terminal of the regulator circuit and a negative input coupled to a headroom threshold voltage reference;
    a digital counter circuit coupled to the comparator circuit and configured to increment or decrement its output based on a signal from the comparator circuit;
    a current output DAC (current-mode digital-to-analog converter) coupled to the output of the digital counter circuit and configured to output a DC voltage adjustment current signal to the voltage divider;

wherein
the power converter is configured to maintain the voltage at the feedback node at an internal feedback reference voltage to provide the target output DC voltage to the LED string; and
the headroom control circuit is configured to maintain a desired headroom in the voltage supply to the LED string according to the DC voltage adjustment current signal from the DAC.

22. A power supply for driving a plurality of LED (light-emitting diode) strings, the power supply comprising:
a power converter, including:
a power input node coupled to an input voltage;
an output node coupled to a first end of each of the plurality of LED strings through voltage divider having a first resistor and a second resistor; and
a feedback node for receiving a feedback signal from the output node;
wherein the power converter is configured to convert the input voltage to a target output DC voltage in response to the feedback signal;
a regulator circuit coupled to each of the plurality of LED strings and to the power converter; wherein each regulator circuit has an output terminal coupled to a second end of a respective one of the LED strings for regulating a current in the LED string; and
a headroom control circuit, comprising:
a comparator for each LED string, with a positive input coupled to the second end of the LED string and a negative input coupled to a headroom threshold voltage reference for the LED string;
an AND logic circuit for receiving the outputs from the comparators and for providing an output that represents an AND logic of the outputs of the comparators;
a digital counter circuit coupled to the comparator and configured to increment or decrement its output based on the output of the AND logic circuit;
a current output DAC (current-mode digital-to-analog converter) coupled to the output of the digital counter circuit and configured to output a DC voltage adjustment signal to the feedback node of the power converter;
wherein:
the power converter is configured to maintain the voltage at the feedback node at an internal feedback reference voltage to provide the target output DC voltage to the LED strings; and
the headroom control circuit is configured to maintain a desired headroom in the voltage supply to the LED strings according to the output of the DAC.

* * * * *